(12) United States Patent
    Ohnuma

(10) Patent No.: US 9,660,258 B2
(45) Date of Patent: May 23, 2017

(54) LITHIUM-ION SECONDARY BATTERY

(71) Applicant: TDK CORPORATION, Tokyo (JP)

(72) Inventor: Hirokazu Ohnuma, Tokyo (JP)

(73) Assignee: TDK CORPORATION, Tokyo (JP)

( * ) Notice: Subject to any disclaimer, the term of this patent is extended or adjusted under 35 U.S.C. 154(b) by 299 days.

(21) Appl. No.: 13/851,147

(22) Filed: Mar. 27, 2013

(65) Prior Publication Data

US 2013/0260227 A1   Oct. 3, 2013

(30) Foreign Application Priority Data

Mar. 27, 2012   (JP) ................................ 2012-070960

(51) Int. Cl.
| | |
|---|---|
| *H01M 4/134* | (2010.01) |
| *H01M 10/0564* | (2010.01) |
| *H01M 10/0525* | (2010.01) |
| *H01M 4/04* | (2006.01) |
| *H01M 4/1395* | (2010.01) |
| *H01M 10/0569* | (2010.01) |

(52) U.S. Cl.
CPC ......... *H01M 4/134* (2013.01); *H01M 4/0471* (2013.01); *H01M 4/1395* (2013.01); *H01M 10/0525* (2013.01); *H01M 10/0564* (2013.01); *H01M 10/0569* (2013.01); *Y02T 10/7011* (2013.01)

(58) Field of Classification Search
CPC ............... H01M 4/134; H01M 4/0471; H01M 10/0569; H01M 4/1395; H01M 10/0564; H01M 10/0525; Y02T 10/7011; Y02E 60/122
See application file for complete search history.

(56) References Cited

U.S. PATENT DOCUMENTS

| | | | |
|---|---|---|---|
| 2004/0033419 A1* | 2/2004 | Funabiki | ................... 429/218.1 |
| 2008/0124631 A1 | 5/2008 | Fukui et al. | |
| 2011/0287313 A1 | 11/2011 | Fukuoka et al. | |
| 2013/0157120 A1 | 6/2013 | Shimura et al. | |

FOREIGN PATENT DOCUMENTS

| | | |
|---|---|---|
| CN | 101098026 A | 1/2008 |
| CN | 102122708 A | 7/2011 |
| JP | 2010-102841 A | 5/2010 |
| JP | A-2010-108915 | 5/2010 |
| JP | 2011-243535 A | 12/2011 |
| WO | 2012/029387 A1 | 3/2012 |

* cited by examiner

*Primary Examiner* — Cynthia K Walls
(74) *Attorney, Agent, or Firm* — Oliff PLC

(57) ABSTRACT

The negative electrode is formed from silicon, an amount of heat generation in a negative electrode, which is measured by a differential scanning calorimeter within a range of 210 to 380° C. during full charge, is 850 J/g or less, and a cyclic carbonate including ethylene carbonate and a chain carbonate which has a chemical formula expressed by $R_1$—O—CO—$OR_2$, and in which $R_1$ and $R_2$ represent an alkyl group having a carbon number of 2 or more are used for an electrolytic solution.

4 Claims, 1 Drawing Sheet

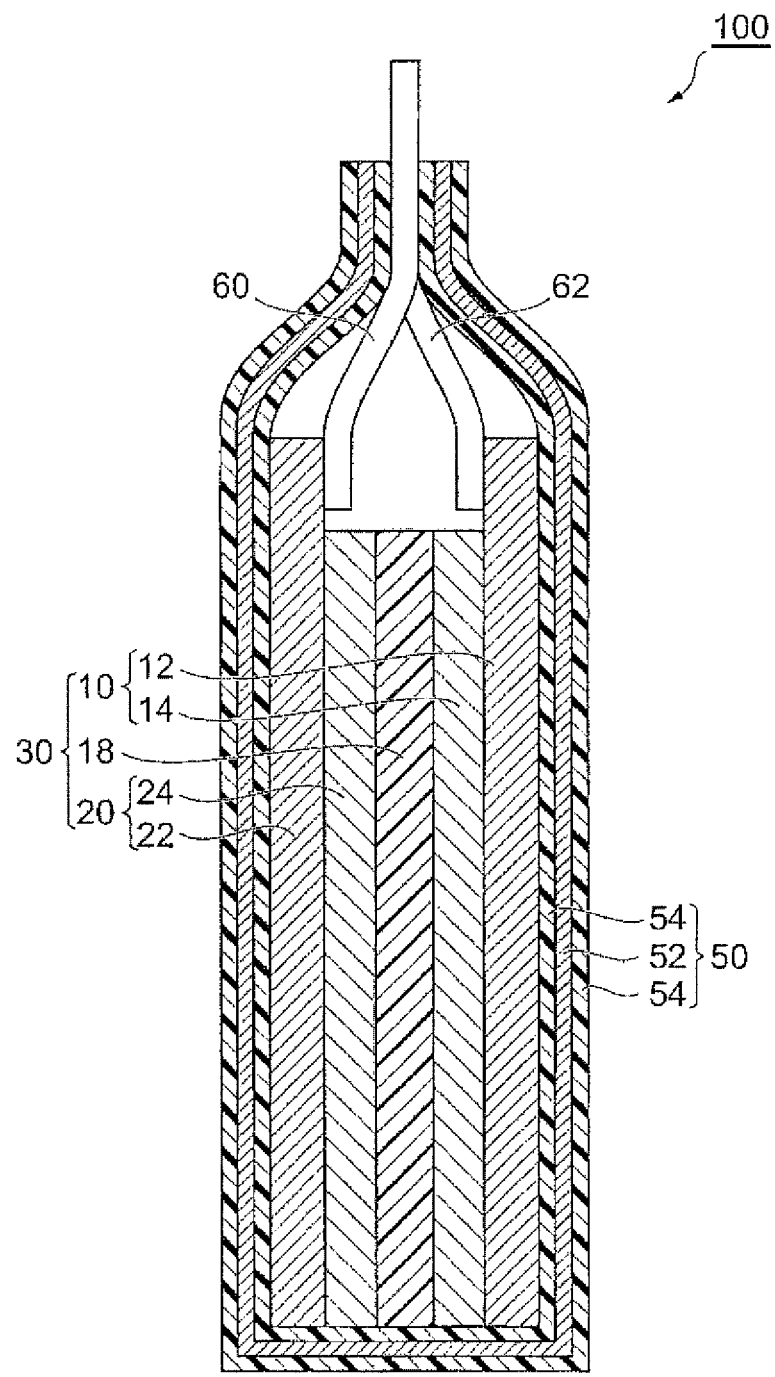

LITHIUM-ION SECONDARY BATTERY

BACKGROUND OF THE INVENTION

1. Field of the Invention

A lithium-ion secondary battery is small in size and light in weight compared to a lead storage battery or a nickel-hydrogen battery in the related art. The lithium-ion secondary battery has characteristics in which a voltage of a single cell is high, energy density is high, a memory effect is small, and self-discharge is small. Due to these characteristics, the lithium-ion secondary battery is mounted on an apparatus such as a cellular phone and a notebook personal computer that are small in size and are portable. Furthermore, the lithium-ion secondary battery is starting to be used for a part of hybrid cars.

2. Description of the Related Art

It is necessary to increase a capacity of each of a positive electrode and a negative electrode so as to increase energy density of a battery. However, in a part of negative electrodes, an effective capacity of graphite, which is used in current batteries, is approximately 360 $mAhg^{-1}$, and this value is approximately compatible to a theoretical capacity (372 $mAhg^{-1}$). Therefore, it is necessary to change a material so as to increase the capacity of the negative electrode.

Examples of a material of a negative electrode in which a capacity is high and a discharge electric potential is low include silicon (hereinafter, referred to as "Si"). However, in Si a volume variation is large during charging/discharging, and miniaturization of particles progresses during repetition of a charging/discharging cycle, and thus contact properties between a current collector and a conductive auxiliary agent decreases. Therefore, there is a tendency for deterioration of characteristics to easily occur.

Therefore, various methods are suggested to suppress deterioration of Si during charging/discharging cycles. For example, as described in Japanese Unexamined Patent Application Publication No. 2010-108915, a method of restricting a used ratio of Si may be exemplified. However, when the used ratio of Si is restricted, a substantial discharge capacity is apt to decrease. Therefore, the deterioration of the characteristics in the case of repeating the charging/discharging cycle may not be prevented. In addition, no review for improving stability of a battery using Si has been made until now.

SUMMARY OF THE INVENTION

Accordingly, it is an object of the invention to provide a lithium-ion secondary battery which uses silicon for a negative electrode, and in which a cycle characteristic is sufficiently high.

According to an embodiment of the invention, there is provided a lithium-ion secondary battery including a positive electrode, a negative electrode, and an electrolytic solution. The negative electrode contains silicon, and an amount of heat generation, which is measured by a differential scanning calorimeter within a range of 210 to 380° C. during full charge, is 850 J/g or less. The electrolytic solution contains a chain carbonate and a cyclic carbonate. The chain carbonate is a compound which has a chemical formula expressed by $R_1$—O—CO—O$R_2$, and in which $R_1$ and $R_2$ represent an alkyl group having a carbon number of 2 or more. The cyclic carbonate includes ethylene carbonate.

When the lithium-ion secondary battery having configured as described above is used, a cycle characteristic and thermal stability are improved. This is assumed to be because the compound, which has a chemical formula expressed by $R_1$—O—CO—O$R_2$, and in which $R_1$ and $R_2$ represent an alkyl group having a carbon number of 2 or more, is used as the chain carbonate, and thus the negative electrode becomes stable.

In the lithium-ion secondary battery of the invention, it is preferable that the chain carbonate be diethyl carbonate.

In the lithium-ion secondary battery of the invention, it is preferable that the negative electrode be heat-treated under an inert atmosphere.

According to the invention, a lithium-ion secondary battery, which uses silicon for a negative electrode, and in which a cycle characteristic is sufficiently high, may be provided.

BRIEF DESCRIPTION OF THE DRAWINGS

FIGURE is a schematic cross-sectional diagram of a lithium-ion secondary battery.

DESCRIPTION OF THE PREFERRED EMBODIMENTS

Hereinafter, a preferred embodiment of the invention will be described in detail with reference to the attached drawing as necessary. In addition, a dimensional ratio of the drawing is not limited to a ratio shown in the drawing.

Lithium-Ion Secondary Battery

A lithium-ion secondary battery 100 mainly includes a stacked body 30, a casing 50 that accommodates the stacked body 30 in a hermetically closed state, and a pair of leads 60 and 62 that are connected to the stacked body 30.

The stacked body 30 is configured in such a manner that a pair of a positive electrode 10 and a negative electrode 20 are disposed to be opposite to each other with a separator 18 interposed therebetween. In the positive electrode 10, a positive electrode active material layer 14 is provided on a sheet-shaped (film-shaped) positive electrode current collector 12. In the negative electrode 20, a negative electrode active material layer 24 is provided on a sheet-shaped (film-shaped) negative electrode current collector 22. The positive electrode active material layer 14 and the negative electrode active material layer 24 come into contact with both sides of the separator 18, respectively. The leads 60 and 62 are connected to ends of the positive electrode current collector 12 and the negative electrode current collector 22, respectively, and ends of the leads 60 and 62 extend to the outside of the casing 50.

Hereinafter, the positive electrode 10 and the negative electrode 20 are collectively referred to as electrodes 10 and 20. The positive electrode current collector 12 and the negative electrode current collector 22 are collectively referred to as current collectors 12 and 22. The positive electrode active material layer 14 and the negative electrode active material layer 24 are collectively referred to as active material layers 14 and 24.

Electrode

The electrodes 10 and 20 will be described in detail. The electrodes 10 and 20 include the current collectors 12 and 22, and the active material layers 14 and 24 that are formed on surfaces of the current collectors 12 and 22 and contain an active material and a binder, respectively.

Positive Electrode 10

The positive electrode current collector 12 may be a conductive sheet material, and may use, for example, a thin metal sheet formed from aluminum, copper, or nickel foil.

The positive electrode active material layer 14 contains an active material and a binder related to this embodiment, and a conductive material in a necessary amount.

A positive electrode active material may be a compound that contains lithium ions and is capable of intercalating and deintercalating the lithium ions, and examples of the positive electrode active material include lithium-containing metal oxides such as $LiCoO_2$, $LiNiO_2$, $LiMn_2O_4$, $Li(Co_xNi_yMn_z)O_2$, $Li(Ni_xCo_yAl_z)O_2$, $Li(Mn_xAl_y)_2O_4$, $Li[Li_xMn_xNi_yCo_z]O_2$, $LiVOPO_4$, and $LiFePO_4$. The binder performs binding of the active material, and performs binding between the active material and the positive electrode current collector 12.

The binder performs binding of the active material, and performs binding between the active material and the positive electrode current collector 12.

A material of the binder may be an arbitrary material as long as the binder is capable of performing the above-described binding, and examples of the material of the binder include fluorine resins such as polyvinylidene fluoride (PVDF), polytetrafluoroethylene (PTFE), tetrafluoroethylene/hexafluoropropylene copolymers (FEP), tetrafluoroethylene/perfluoroalkylvinyl ether copolymers (PFA), ethylene/tetrafluoroethylene copolymers (ETFE), polychlorotrifluoroethylene (PCTFE), ethylene/chlorotrifluoroethylene copolymers (ECTFE), and polyvinyl fluoride (PVF).

In addition, in addition to the resins, for example, polyethylene, polypropylene, polyethylene terephthalate, polyamide (PA), polyimide (PI), polyamide imide (PAI), aromatic polyamide, cellulose, styrene/butadiene rubber, isoprene rubber, butadiene rubber, ethylene/propylene rubber, or the like may be used as the binder. In addition, thermoplastic elastomeric polymers such as a styrene/butadiene/styrene block copolymer, a hydrogen additive thereof, a styrene/ethylene/butadiene/styrene copolymer, styrene/isoprene/styrene/block copolymer, and a hydrogen additive thereof may be used. Furthermore, syndiotactic 1,2-polybutadiene, an ethylene/vinyl acetate copolymer, a propylene/α-olefin (having a carbon number of 2 to 12) copolymer, or the like may be used.

In addition, an electronically conductive polymer or an ionically conductive polymer may be used as the binder. Examples of the electronically conductive polymer include polyacetylene and the like. In this case, the binder also exhibits a function of a conductive material, and thus the conductive material may not be added. Examples of the ionically conductive polymer include polymers, which are obtained by compounding a polymer compound such as polyethylene oxide and polypropylene oxide with a lithium salt or an alkali metal salt that contains lithium as a main component, and the like.

A content rate of the binder that are contained in the positive electrode active material layer 14 is preferably 0.5 to 6% by mass one the basis of mass of the active material layer. When the content rate of the binder is less than 0.5% by mass, an amount of the binder becomes too less, and thus a tendency in which a strong active material layer may not be formed increases. In addition, when the content rate of the binder exceeds 6% by mass, an amount of the binder, which does not contribute to an electric capacity, increases, and thus a tendency in which it is difficult to obtain sufficient volumetric energy density increases. In addition, in this case, particularly, when electron conductivity of the binder is low, an electric resistance of the active material layer increases, and thus a tendency in which a sufficient electric capacity may not be obtained increases.

Examples of the conductive materials include carbon powders such as carbon black, carbon nanotubes, carbon materials, metal fine powders of copper, nickel, stainless steel, iron, and the like, mixtures of the carbon materials and the metal fine powders, conductive oxides such as ITO, and the like.

Negative Electrode 20

The negative electrode current collector 22 may be a conductive sheet material, and for example, a thin metal sheet of aluminum, copper, or nickel foil may be used as the negative electrode current collector 22.

As the negative electrode active material, silicon or a silicon-containing oxide may be used, and the negative electrode active material may contain both of these. As the silicon-containing oxide, silicon monoxide (SiO), silicon dioxide ($SiO_2$), or the like may be used. These may be used alone or in combination of two or more kinds.

An amount of heat generation of the negative electrode, which is measured by a differential scanning calorimeter within a range of 210 to 380° C. during full charge, is 850 J/g or less.

Here, the "full charge" represents a state in which a negative electrode half cell is charged with a current value at which current density with respect to the negative electrode active material becomes 10 mA/g until an electric potential of the negative electrode becomes 5 mV (vs. $Li/Li^+$).

In addition, when the amount of heat generation, which is measured by a differential scanning calorimeter within a range of 210 to 380° C., is 850 J/g or less, a possibility of preventing firing even under strict conditions such as a heating test or over discharge test increases, and thus stability is improved.

It is preferable that the negative electrode active material is subjected to a heat treatment before assembling of a lithium-ion secondary battery. This heat treatment may be performed at the time of a negative electrode active material single element or after the negative electrode active material layer 24 is formed on the negative electrode current collector 22, that is, after forming the negative electrode. In addition, the heat treatment is performed in an inert atmosphere such as in vacuum, $N_2$, and Ar, but the heat treatment is preferably performed in vacuum.

With regard to a temperature during the heat treatment, when the amount of heat is measured by the differential scanning calorimeter with respect to the negative electrode active material that is not charged, and a mixture of Si and SiO, an exothermic peak is present near 220° C. However, when the negative electrode active material is heat-treated in an inert atmosphere, this peak may not be present. Accordingly, the heat treatment of the negative electrode active material is preferably performed at a temperature of 220° C. or higher. In addition, the heat treatment time may be set to 1 hour or longer.

Absence of the exothermic peak near 220° C. basically represents that the exothermic peak near 220° C. disappears. It is preferable that a peak area be 1/10 times or less compared to a case before the heat treatment.

It is preferable that the measurement by the differential scanning calorimeter be performed in $N_2$ or Ar so as to prevent reaction between a sample and oxygen or moisture in the air. In addition, a temperature rising rate during the measurement may be set to an arbitrary numeric value. However, the temperature rising rate is too high, separation between peaks becomes poor, and when the temperature rising rate is too low, a minute peak does not appear. Accordingly, it is preferable that the measurement be performed at a gradual rate to a certain degree. 5 to 20° C./min is preferable, and 10° C./min is more preferable. In addition, a measurement temperature range may be wide, since almost all of peaks appear in the range of 210 to 380° C., a range of room temperature to 400° is preferable. The amount of heat generation may be calculated by integrating areas of peaks that appear at this temperature range. In addition, an error of ±5% is present in the measurement of the amount of heat generation according to this method. 850 J/g or less is preferable.

The same binder and conductive material as that of the positive electrode may be used, respectively. However, the content of the binder in the negative electrode is preferably 3 to 30% by mass. This is because in the silicon that is an active material of the negative electrode, a volume variation accompanying intercalation and deintercalation of the lithium is large, and thus compared to the positive electrode, a large amount of binder is necessary to form a strong active material layer.

Next, a method of manufacturing the electrodes 10 and 20 related to this embodiment will be described.

Method of Manufacturing Electrodes 10 and 20

The method of manufacturing the electrodes 10 and 20 related to this embodiment includes a process of applying a coating material that is a raw material of the electrode active material layers 14 and 24 onto a current collector (hereinafter, may be referred to as an "application process"), and a process of removing a solvent in the coating material that is applied onto the current collector to form an electrode active material layer (hereinafter, may be referred to as a "solvent removing process").

Application Process

The application process of applying the coating material onto the current collectors 12 and 22 will be described. The coating material contains the active material, the binder, and the solvent. In addition to these components, the coating material may further contain, for example, a conductive material for increasing conductivity of the active material. As the solvent, for example, water, N-methyl-2-pyrrolidone, N—N-dimethyl formamide, or the like may be used.

A method of mixing the components such as active material, the binder, the solvent, and the conductive material that constitute the coating material is not particularly limited, and a mixing sequence is also not particularly limited. For example, first, the active material, the conductive material, and the binder are mixed with each other, and N-methyl-2-pyrrolidone is added to and mixed with the resultant mixture to adjust the coating material.

The above-described coating material is applied onto the current collectors 12 and 22. An application method is not particularly limited, and a method commonly adapted in a case of preparing an electrode may be used. Examples of the application method include a slit die coating method, a doctor blade method, and the like.

Solvent Removing Process

Consequently, the solvent in the coating material applied onto the current collectors 12 and 22 is removed. A removal method is not particularly limited, and the current collectors 12 and 22 onto which the coating material is applied may be dried, for example, in an atmosphere of 80 to 150° C.

Pressing Process

The electrodes on which the active material layers 14 and 24 are formed as described above may be pressed, for example, by a roll press machine or the like as necessary. For example, a linear pressure of the roll press may be set to 10 to 50 kgf/cm.

Through the above-described processes, the electrode active material layers 14 and 24 are formed on the current collectors 12 and 22.

Furthermore, as described above with regard to the negative electrode, in the invention, a heat treatment of the negative electrode may be performed at a point of time at which the pressing process is terminated. An atmosphere during the heat treatment of the negative electrode is performed in an inert atmosphere such as in vacuum, $N_2$, and Ar, but the heat treatment is preferably performed in vacuum. When the amount of heat is measured by the differential scanning calorimeter with respect to the negative electrode active material that is not charged, Si, and SiO, an exothermic peak is present near 220° C. However, when the negative electrode active material is heat-treated in an inert atmosphere, this peak may not be present. The heat treatment is preferably performed at a temperature of 220° C. or higher. In addition, the heat treatment time may be set to 1 hour or longer.

Electrolytic Solution

The electrolytic solution related to the invention contains a solvent formed from a cyclic carbonate and a chain carbonate, various electrolytes that serve as a supporting salt, and various additives.

Examples of the cyclic carbonate include ethylene carbonate, propylene carbonate, fluoroethylene carbonate, and the like, and the cyclic carbonate includes at least ethylene carbonate.

As the chain carbonate, a carbonate, which has a chemical formula expressed by $R_1$—O—CO—$OR_2$ and in which $R_1$ and $R_2$ represent an alkyl group having a carbon number of 2 or more, is used. Examples of the chain carbonate include diethyl carbonate, ethylpropyl carbonate, dipropyl carbonate, and the like. Particularly, it is preferable to use diethyl carbonate from the viewpoint of conductivity of the electrolytic solution.

In a case of using a carbonate in which one or both of $R_1$ and $R_2$ in $R_1$—O—CO—$OR_2$ is a methyl group, for example, dimethyl carbonate, decomposition occurs on a silicon electrode, and charging of the negative electrode is not performed, and thus this is not appropriate.

In a case where a electrochemical device is a lithium-ion secondary battery, a lithium salt is used as the electrolyte. Examples of the lithium slat include $LiPF_6$, $LiClO_4$, $LiBF_4$, $LiAsF_6$, $LiCF_3SO_3$, $LiCF_3CF_2SO_3$, $LIC(CF_3SO_2)_3$, $LIN(CF_3SO_2)_2$, $LiN(SO_2F)_2$, $LIN(CF_3CF_2SO_2)_2$, $LiN(CF_3SO_2)(C_4F_9SO_2)$, $LiN(CF_3CF_2CO)_2$, and the like. In addition, these salts may be used alone or in combination of two or more kinds.

In addition, as the additive, an additive that is known in the related art may be added. For example, vinyl carbonate, vinylene carbonate, or the like may be added in an amount of additive.

The separator 18 is an electrically insulating porous body, and examples thereof include a single layer body of a film formed from polyethylene, polypropylene, or polyolefin and a stacked body thereof, an extended film of a mixture of the resins, and a fiber non-woven fabric formed from at least one kind of constituent materials selected from a group consisting of cellulose, polyester, and polypropylene.

The casing 50 is configured to hermetically seal the stacked body 30 and the electrolytic solution at the inside thereof. The casing 50 is not particularly limited as long as the casing 50 is capable of suppressing leakage of the electrolytic solution to the outside, intrusion of moisture into the inside of the electrochemical device 100 from the outside, and the like. For example, as shown in FIGURE, a metal laminate film in which both sides of metal foil 52 are coated with a polymer film 54 may be used as the casing 50. As the metal foil 52, for example, aluminum foil may be used, and as the polymer film 54, a film of polypropylene or the like may be used. For example, as a material of the outer side polymer film 54, a polymer having a high melting point, for example, polyethylene terephthalate (PET), polyamide, or the like is preferable. As a material of the inner side polymer film 54, polyethylene (PE), polypropylene (PP), or the like preferable.

The leads 60 and 62 are formed from a conductive material such as aluminum.

In addition, according to a method that is known in the related art, the leads 60 and 62 are welded to the positive electrode current collector 12 and the negative electrode current collector 22, respectively. In a state in which the separator 18 is interposed between the positive electrode active material layer 14 of the positive electrode 10 and the negative electrode active material layer 24 of the negative electrode 20, the resultant stacked body is inserted into the casing 50 together with the electrolytic solution, and then the an inlet of the casing 50 may be sealed.

Hereinbefore, a preferred embodiment of the nonaqueous electrolytic solution, the electrodes, the lithium-ion secondary battery provided with the electrolytic solution and the electrodes, and the manufacturing method thereof has been described in detail, but the invention is not limited to the embodiment.

EXAMPLES

Hereinafter, the invention will be described in more detail on the basis of examples and comparative examples. The invention is not limited to the following examples.

Example 1

Preparation of Negative Electrode

As the negative electrode active material, a material, which was obtained by mixing Si and SiO in a ratio (Si/SiO) of ½ (weight ratio) and pulverizing and mixing the resultant mixture using a planetary ball mill, was used.

As a medium of the planetary ball mill, an alumina bead having a diameter of 3 mm was used, the number of revolutions was set to 500 rpm, and a pulverizing and mixing time was set to 60 min.

87 parts by mass of the mixture of Si and SiO as the negative electrode active material, 3 parts by mass of acetylene black as the conductive auxiliary agent, and 10 parts by mass of polyamide imide as the binder were mixed to prepare a negative electrode mixture. The negative electrode mixture was mixed with N-methyl-2-pyrrolidone as a solvent to prepare a coating material. This coating material was applied onto copper foil (thickness: 15 μm) as the current collector with a doctor blade method, and the applied coating material was dried at 80° C. and was pressed, whereby the negative electrode active material layer was formed on a surface of the copper foil. The copper foil was provided with a portion to which the coating material was not applied so as to connect an external lead-out terminal thereto. The applied coating material was dried in vacuum at 350° C. for 3 hours. As the external lead-out terminal, a terminal, which was obtained by winding polypropylene, to which a maleic acid anhydride is grafted, on the nickel foil so as to improve sealing properties with an exterior casing, was prepared. This nickel foil and the copper foil that was obtained by applying and drying the coating material were ultrasonic-welded.

Preparation of Positive Electrode $Li(Ni_{0.85}Co_{0.10}Al_{0.05})O_2$ as the positive electrode active material, polyvinylidene fluoride as the binder, carbon black and graphite as the conductive auxiliary agent, and N-methyl-2-pyrrolidone as the solvent were mixed to prepare the coating material. This coating material was applied onto aluminum foil (thickness: 20 μm) as the current collector with the doctor blade method, and the applied coating material was dried at 100° C. and was pressed, whereby the positive electrode active material layer was formed on a surface of the aluminum foil. In addition, the aluminum foil was provided with a portion to which the coating material was not applied so as to connect an external lead-out terminal thereto. As the external lead-out terminal, a terminal, which was obtained by winding polypropylene, to which a maleic acid anhydride is grafted, on the aluminum foil so as to improve sealing properties with an exterior casing, was prepared. This aluminum foil and the aluminum foil that was obtained by applying and drying the coating material were ultrasonic-welded.

Preparation Electrolytic Solution $LiPF_6$ with a concentration of 1 M was dissolved in a solution obtained by mixing 30 vol % of ethylene carbonate and 70 vol % of diethyl carbonate to prepare an electrolytic solution.

Preparation of Lithium-Ion Secondary Battery Cell

The positive electrode and the negative electrode that were prepared as described, and a separator (fine porous film formed from polyolefin) were cut to have predetermined dimensions. The positive electrode, the negative electrode, and the separator that were cut were stacked in the order of the negative electrode, the separator, the positive electrode, the separator, and the negative electrode, whereby a stacked body for full cell was prepared. The exterior casing configured to enclose the stacked body was formed from an aluminum laminate material, and had a configuration of polyethylene terephthalate (12 μm)/Al (40 μm)/polypropylene (50 μm). In addition, the exterior casing was formed into a bag shape in such a manner that the polypropylene was located at an inner side. The stacked body was put into the exterior casing, an appropriate amount of the electrolytic solution that was prepared as described above was added into the exterior casing, and the exterior casing was vacuum-sealed, whereby a lithium-ion secondary battery cell (hereinafter, referred to as a "cell") was prepared.

Initial Charging/Discharging

The cell prepared as described above was charged with a current value at which current density with respect to the positive electrode active material became 10 mA/g by a charging/discharging test machine for 3 hours. A gas generated inside the cell was removed, and then the cell was charged again with a current value at which current density with respect to the positive electrode active material became 19 mA/g by the charging/discharging test machine until an electric potential of the positive electrode became 4.2 V (vs. $Li/Li^+$). Then, discharging was performed with a current value at which the current density with respect to the positive electrode active material became 19 mA/g until the electric potential of the positive electrode became 2.5 V (vs. $Li/Li^+$).

Measurement of Discharge Capacity

The cell prepared as described above was charged with a charging/discharging rate of 0.5 C (a current value with which discharging was terminated within 5 hours when performing constant-current discharging was performed at 25° C.) by the charging/discharging test machine until the cell voltage became 4.2 V, and then a discharge capacity (unit: mAh) in a case of performing discharging until the cell voltage became 2.5 V was measured. This was repeated 400 times. A variation in the discharge capacity at this time is shown in Table 1.

Measurement of Amount of Heat Generation of Negative Electrode

A negative electrode half cell, in which a counter electrode was lithium metal foil, was separately prepared and used for measurement of the amount of heat generation. The negative electrode and the separator were cut to have predetermined dimensions, and the negative electrode, the separator, and the lithium metal were stacked in this order, whereby a stacked body for the negative electrode half cell was prepared. An appropriate amount of the electrolytic solution that was prepared was added, and then the exterior casing was hermetically vacuum-sealed, whereby a negative electrode half cell was prepared. In addition, the same member as the above-described lithium-ion secondary battery cell except that the negative electrode was used for the half cell and the negative electrode active material layer was formed on side of the current collector was used. The prepared cell was charged with a current value as which the current density with respect to the negative electrode active material became 10 mA/g until the electric potential of the negative electrode became 5 mV (vs. Li/Li$^+$). This state was set as a fully charge state. Then, a part of the negative electrode active material layer was taken out within a glove box under an argon atmosphere, and approximately 1 mg of thereof was put into a SUS container having a diameter of 5 mm, and this container was hermetically closed with a SUS lid. Then, a sample was taken out from the glove box, and the amount of heat generation was measured with the differential scanning calorimeter. In addition, a measurement range was set to 25 to 400° C., a temperature rising rate was set to 10° C./min, and a reference material was alumina (a component of the differential scanning calorimeter). In addition, the amount of heat generation was calculated by integrating areas of peaks that appear at a range of 210 to 380° C.

Example 2

As the electrolytic solution, an electrolytic solution, which was obtained by dissolving LiPF$_6$ with a concentration of 1 M in a solution obtained by mixing 10 vol % of ethylene carbonate, 20 vol % of propylene carbonate, and 70 vol % of diethyl carbonate, was used. Example 2 was carried out in the same manner as Example 1 except for this.

Example 3

The negative electrode active material was vacuum-dried under conditions of 350° C. and 3 hours, and then the negative electrode was prepared. After forming the negative electrode, the negative electrode was not heat-treated. Example 3 was carried out in the same manner as Example 1 except for this.

Example 4

As the electrolytic solution, an electrolytic solution, which was obtained by dissolving LiPF$_6$ with a concentration of 1 M in a solution obtained by mixing 30 vol % of ethylene carbonate, 40 vol % of diethyl carbonate, and 30 vol % of ethylpropyl carbonate, was used. Example 4 was carried out in the same manner as Example 1 except for this.

Example 5

As the electrolytic solution, an electrolytic solution, which was obtained by dissolving LiPF$_6$ with a concentration of 1 M in a solution obtained by mixing 30 vol % of ethylene carbonate, 50 vol % of diethyl carbonate, and 20 vol % of dipropyl carbonate, was used. Example 5 was carried out in the same manner as Example 1 except for this.

Comparative Example 1

As the electrolytic solution, an electrolytic solution, which was obtained by dissolving LiPF$_6$ with a concentration of 1 M in a solution obtained by mixing 30 vol % of ethylene carbonate, and 70 vol % of ethylmethyl carbonate, was used. Comparative Example 1 was carried out in the same manner as Example 1 except for this.

Comparative Example 2

The negative electrode was used as is without being dried in vacuum. Comparative Example 2 was carried out in the same manner as Example 1 except for this.

Comparative Example 3

The negative electrode was used as is without being dried in vacuum. Furthermore, as the electrolytic solution, an electrolytic solution, which was obtained by dissolving LiPF$_6$ with a concentration of 1 M in a solution obtained by mixing 10 vol % of ethylene carbonate, 20 vol % of propylene carbonate, and 70 vol % of diethyl carbonate, was used. Comparative Example 3 was carried out in the same manner as Example 1 except for these.

Comparative Example 4

As the electrolytic solution, an electrolytic solution, which was obtained by dissolving LiPF$_6$ with a concentration of 1 M in a solution obtained by mixing 30 vol % of propylene carbonate, and 70 vol % of diethyl carbonate, was used. Comparative Example 4 was carried out in the same manner as Example 1 except for this.

TABLE 1

| Samples | Composition of solvent (vol %) | | | | | Heat treatament of negative electorde | Capacity variation rate after 400 cycles | Amount of heat genartion of negative electorde (J/g) |
| --- | --- | --- | --- | --- | --- | --- | --- | --- |
| | EC | PC | DEC | EPC | DPC | EMC | | |
| Example 1 | 30 | | 70 | | | | Perfromed after forming negative electrode active material layer | −45.3% | 785.5 |

TABLE 1-continued

| Samples | Composition of solvent (vol %) | | | | | | Heat treatement of negative electorde | Capacity variation rate after 400 cycles | Amount of heat genartion of negative electorde (J/g) |
| --- | --- | --- | --- | --- | --- | --- | --- | --- | --- |
| | EC | PC | DEC | EPC | DPC | EMC | | | |
| Example 2 | 10 | 20 | 70 | | | | Perfromed after forming negative electrode active material layer | −53.8% | 695.0 |
| Example 3 | 30 | | 70 | | | | Performed only to negative electrode active material | −64.9% | 704.7 |
| Example 4 | 30 | | 40 | 30 | | | Performed after forming negative electrode active material layer | −69.0% | 842.2 |
| Example 5 | 30 | | 50 | | 20 | | Performed after forming negative electrode active material layer | −63.4% | 816.8 |
| Comparative Example 1 | 30 | | | | | 70 | Performed after forming negative electrode active material layer | −99.7% | Heat is not generated |
| Comparative Example 2 | 30 | | 70 | | | | Not performed | −79.0% | 1814.7 |
| Comparative Example 3 | 10 | 20 | 70 | | | | Not performed | −69.2% | 1095.2 |
| Comparative Example 4 | | 30 | 70 | | | | Performed after forming negative electrode active material layer | Charging/discharging is not carried out | Heat is not generated |

EC: ethylene carbonate
PC: propylene carbonate
DEC: diethyl carbonate
EPC: ethylpropyl carbonate
DPC: dipropyl carbonate
EMC: ethylmethyl carbonate As shown in Table 1, in the examples, a capacity variation rate after 400 cycles was improved compared to the comparative examples.

Furthermore, the amount of heat generation of the negative electrode decreased in all of the examples compared to the comparative examples, and stability was improved.

In addition, Comparative Examples 1 and 4 did not generate heat. This was caused by the fact that the negative electrode did not show an exothermic peak in a case where charging was not performed. Comparative Examples 1 and 4 entered a state in which the discharge capacity was greatly low during first time of charging/discharging compared to the examples or other comparative examples, and charging was substantially not carried out. The charging was substantially not carried out even in the half cell for measurement of the amount of heat generation. Therefore, it was assumed that Comparative Examples 1 and 4 did not show the exothermic peak even in the measurement by the differential scanning calorimeter similarly to the electrode that was not charged.

Although the following fact is not understood at the time of filing this application, the present inventors understood later that the reason why the amount of heat generation decreases at a fully charged state is to be because a phase change occurs when SiO as the negative electrode active material is heat-treated at 220° C. or higher, and the negative electrode active material becomes a relatively stable material. Accordingly, the same effect may be expected even in a phase change occurred by high-pressure heating in an inert atmosphere such as Ar or long-term mechanical milling in addition to the vacuum drying.

What is claimed is:

1. A lithium-ion secondary battery comprising:
a positive electrode;
a negative electrode; and
an electrolytic solution,
wherein the negative electrode contains silicon, and an amount of heat generation, which is measured by a differential scanning calorimeter within a range of 210 to 380° C. during full charge, is 850 J/g or less,
the electrolytic solution contains a chain carbonate and a cyclic carbonate,
the chain carbonate is a compound which has a chemical formula expressed by $R_1$—O—CO—$OR_2$, and in which $R_1$ and $R_2$ represent an alkyl group having a carbon number of 2 or more, and
the cyclic carbonate includes ethylene carbonate.

2. The lithium-ion secondary battery according to claim 1, wherein the chain carbonate is diethyl carbonate.

3. The lithium-ion secondary battery according to claim 1, wherein the negative electrode is heat-treated under an inert atmosphere.

4. The lithium-ion secondary battery according to claim 2, wherein the negative electrode is heat-treated under an inert atmosphere.

* * * * *